(12) United States Patent
Pfister et al.

(10) Patent No.: US 8,848,068 B2
(45) Date of Patent: Sep. 30, 2014

(54) AUTOMATED RECOGNITION ALGORITHM FOR DETECTING FACIAL EXPRESSIONS

(75) Inventors: Tomas Pfister, Oxford (GB); Matti Pietikäinen, Oulu (FI); Xiaobai Li, Oulu (FI); Guoying Zhao, Oulu (FI)

(73) Assignee: Oulun Yliopisto, Oulu (FI)

( * ) Notice: Subject to any disclaimer, the term of this patent is extended or adjusted under 35 U.S.C. 154(b) by 173 days.

(21) Appl. No.: 13/466,593

(22) Filed: May 8, 2012

(65) Prior Publication Data

US 2013/0300900 A1 Nov. 14, 2013

(51) Int. Cl.
*H04N 5/235* (2006.01)
*H04N 9/47* (2006.01)
*H04N 7/18* (2006.01)
*G06K 9/00* (2006.01)
*G06K 9/62* (2006.01)
*G06K 9/46* (2006.01)
*G06K 9/66* (2006.01)

(52) U.S. Cl.
USPC .......... 348/222.1; 348/77; 382/118; 382/159; 382/190; 382/209

(58) Field of Classification Search
CPC .......... G06K 9/00221; G06K 9/00228; G06K 9/00302; G06K 9/00268; G06K 9/00288; G06K 9/00315; G06K 9/00308; H04N 5/23219
USPC ......... 348/77, 222.1; 382/118, 195, 159, 190, 382/209
See application file for complete search history.

(56) References Cited

U.S. PATENT DOCUMENTS

| | | | | |
|---|---|---|---|---|
| 5,611,037 A | * | 3/1997 | Hayashi | 345/442 |
| 6,072,496 A | * | 6/2000 | Guenter et al. | 345/419 |
| 6,657,628 B1 | * | 12/2003 | Cook | 345/473 |
| 6,735,566 B1 | * | 5/2004 | Brand | 704/256 |
| 7,421,098 B2 | * | 9/2008 | Bronstein et al. | 382/118 |
| 8,374,422 B2 | * | 2/2013 | Roussel | 382/154 |
| 2008/0260212 A1 | * | 10/2008 | Moskal et al. | 382/118 |
| 2010/0141663 A1 | * | 6/2010 | Becker et al. | 345/473 |
| 2010/0182325 A1 | * | 7/2010 | Cederwall et al. | 345/473 |
| 2011/0007174 A1 | * | 1/2011 | Bacivarov et al. | 348/222.1 |
| 2011/0069879 A1 | * | 3/2011 | Hwang et al. | 382/154 |
| 2011/0110561 A1 | * | 5/2011 | Havaldar | 382/103 |
| 2011/0134220 A1 | * | 6/2011 | Barbour et al. | 348/44 |
| 2011/0150322 A1 | * | 6/2011 | Bedros et al. | 382/154 |
| 2012/0076368 A1 | * | 3/2012 | Staudacher et al. | 382/118 |
| 2013/0101219 A1 | * | 4/2013 | Bosworth et al. | 382/195 |
| 2013/0177218 A1 | * | 7/2013 | Hirai | 382/118 |
| 2013/0242187 A1 | * | 9/2013 | Noda et al. | 348/441 |
| 2013/0322770 A1 | * | 12/2013 | Kaneda et al. | 382/201 |
| 2013/0343732 A1 | * | 12/2013 | Suzuki | 386/353 |
| 2014/0016836 A1 | * | 1/2014 | Gamliel | 382/118 |

OTHER PUBLICATIONS

Zhao, G., et al., "Dynamic Texture Recognition Using Local Binary Patterns with an Application to Facial Expressions," *IEEE Transactions on Pattern Analysis and Machine Intelligence*; pp. 1-14 (2007).
Zhou, Z., et al., "Towards a Practical Lipreading System," Computer Science and Engineering Laboratory, University of Oulu, Oulu, Finland (Presented at the IEEE International Conference on Computer Vision and Pattern Recognition, pp. 137-144 (2011).
Pfister, T. et al., "Recognising Spontaneous Facial Micro-expressions," Department of Computer Science and Engineering, University of Oulu, Oulu, Finland (Presented at the IEEE International Conference on Computer Vision, 8 pages (2011).

* cited by examiner

*Primary Examiner* — Chia-Wei A Chen
(74) *Attorney, Agent, or Firm* — Hamilton, Brook, Smith & Reynolds, P.C.

(57) ABSTRACT

This document discloses a solution for detecting human facial micro-expressions automatically by a video analysis system. Facial micro-expressions are involuntary expressions having a very short duration.

17 Claims, 4 Drawing Sheets

MODEL FACE

SUBJECT'S FACE

AUTOMATED RECOGNITION ALGORITHM FOR DETECTING FACIAL EXPRESSIONS

FIELD

The invention relates to the field of video analysis systems and, particularly, to detecting facial expressions from an image sequence.

BACKGROUND

Machine vision has been an interesting topic in scientific communities for some time, and even some commercial applications have appeared on the markets. However, state-of-the-art machine vision systems need improvement.

BRIEF DESCRIPTION

According to an aspect of the present invention, there is provided a method for automated video analysis in a video analysis system, the method comprising: storing a database comprising training data for a micro-expression classifier, wherein the training data comprises spatio-temporal local texture reference descriptors for a plurality of spontaneous facial micro-expressions, wherein spatio-temporal local texture reference descriptors associated with a micro-expression describe temporal dynamic features in consecutive reference video frames containing the micro-expression; acquiring an image sequence comprising a plurality of video frames; detecting a face in the plurality of video frames; extracting dynamic facial features from the plurality of video frames by computing spatio-temporal local texture descriptors for the plurality of video frames, wherein the spatio-temporal local texture descriptors describe temporal dynamic features acquired through comparison of a plurality of consecutive video frames of the image sequence; and comparing the computed spatio-temporal local texture descriptors with the spatio-temporal local texture reference descriptors and determining on the basis of their similarity whether or not the image sequence comprises a micro-expression.

According to another aspect of the present invention, there is provided an apparatus comprising at least one processor and at least one memory including a computer program code and a database comprising training data for a micro-expression classifier. The training data comprises spatio-temporal local texture reference descriptors for a plurality of spontaneous facial micro-expressions, wherein spatio-temporal local texture reference descriptors associated with a micro-expression describe temporal dynamic features in consecutive reference video frames containing the micro-expression. The at least one memory and the computer program code are configured, with the at least one processor, to cause the apparatus to: acquire an image sequence comprising a plurality of video frames; detect a face in the plurality of video frames; extract dynamic facial features from the plurality of video frames by computing spatio-temporal local texture descriptors for the plurality of video frames, wherein the spatio-temporal local texture descriptors describe temporal dynamic features acquired through comparison of a plurality of consecutive video frames of the image sequence; and compare the computed spatio-temporal local texture descriptors with the spatio-temporal local texture reference descriptors and determine on the basis of their similarity whether or not the image sequence comprises a micro-expression.

According to another aspect of the present invention, there is provided an apparatus comprising at least one processor and at least one memory including a computer program code and a database comprising training data for a micro-expression classifier. The training data comprises reference descriptors for at least one spontaneous facial micro-expression having a duration less than 0.06 seconds, wherein the reference descriptors associated with the micro-expression describe spatial features of at least one reference video frame containing the micro-expression. The at least one memory and the computer program code are configured, with the at least one processor, to cause the apparatus to: acquire an image sequence comprising a plurality of video frames; detect a face in the plurality of video frames; extract facial features from at least one video frame by computing spatial descriptors for the at least one video frame; and compare the computed spatial descriptors with the reference descriptors and determine on the basis of their similarity whether or not the image sequence comprises a micro-expression.

According to another aspect of the present invention, there is provided apparatus comprising at least one processor and at least one memory including a computer program code. The at least one memory and the computer program code are configured, with the at least one processor, to cause the apparatus to acquire an image sequence and to automatically detect a spontaneous human facial micro-expression having a duration less than 0.06 seconds from the image sequence.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments of the present invention relate to machine vision and, particularly, detecting automatically facial micro-expressions on a human face in a video analysis system.

Facial micro-expressions are rapid involuntary facial expressions which reveal suppressed affection, e.g. a suppressed feeling. Humans are good at recognising full facial expressions for the need of normal social interaction, e.g. facial expressions that last for at least half second, but can seldom detect the occurrence of facial micro-expressions, e.g. expressions lasting less than half a second. The micro-expressions may be defined as very rapid involuntary facial expressions which give a brief glimpse to feelings that a person undergoes but tries not to express voluntarily. The length of the micro-expressions may be between ⅓ and ¹⁄₂₅ second, but the precise length definition varies depending for example on the person. Currently only highly trained individuals are able to distinguish them but, even with proper training, the recognition accuracy is very low. There are numerous potential commercial applications for recognising micro-expressions. Police or security personnel may use the micro-expressions to detect suspicious behaviour, e.g. in the airports. Doctors can detect suppressed emotions of patients to recognise when additional reassurance is needed. Teachers can recognise unease in students and give a more careful explanation. Business negotiators can use glimpses of happiness to determine when they have proposed an acceptable price. Since the human recognition accuracy is so low, almost equivalent to guessing, an alternative and automated method for recognising micro-expressions would be very valuable.

Some challenges in recognising micro-expressions relate to their very short duration and involuntariness. The short duration means that only a very limited number of video frames are available for analysis with a standard 25 frame-per-second (fps) camera. Furthermore, with large variations in facial expression appearance, a machine learning approach based on training data suits the problem. Training data acquired from acted voluntary facial expressions are least challenging to gather. However, since micro-expressions are involuntary, acted micro-expressions will differ greatly from spontaneous ones.

Gathering a comprehensive database comprising the training data therefore requires considerable psychological insights and time-consuming experiments to successfully induce spontaneous micro-expressions. Therefore, let us first describe the methodology used when building up the database and the training data. The inventors acquired 20 videos recorded initially for a York deception detection test (YorkDDT) as part of a psychological study. Subjects (persons) either truthfully or deceptively described an emotional or non-emotional video clip shown to the subjects. The emotional video clip illustrated a surgery, while the non-emotional clip provided a mildly positive illustration of a sunny beach. In the truthful scenario, the test subjects viewing the clips were asked to describe the actual content of the video clip. In the deceptive scenario, subjects viewing the emotional video clip were asked to describe the non-emotional video clip, while the subjects viewing the non-emotional video clip were asked to describe the emotional video clip. A number of micro-expressions were detected to occur during both the deceptive and the truthful scenarios. The videos were recorded with a resolution of 320×240 pixels. The inventors segmented the video clips containing the detected micro-expressions and labelled the video clips as truthful/deceptive, emotional/non-emotional according to the scenarios of the video clips. Micro-expressions were found in 9 subjects (3 male and 6 female) which resulted in 18 micro-expressions: 7 from the emotional and 11 from the non-emotional scenario; 11 from the deceptive and 7 from the truthful scenario. The shortest expression was 7 frames at the 25 fps video frame rate, roughly equaling 0.28 seconds.

This set of training data was augmented with another set of training data. This set of training data was acquired by recording spontaneous facial micro-expressions (SMI) by using a 100 fps camera. There were 6 test subjects (3 male, 3 female) that provided 77 spontaneous micro-expressions. Four subjects wore glasses. The videos were recorded in an indoor bunker environment designed to resemble an interrogation room. A PixeLINK PL-B774U camera running at 640×480 with 100 fps was used. Each subject was recorded watching 16 carefully selected film clips chosen to induce disgust, fear, happiness, sadness and/or surprise. The experimental instructions were: 1. attempt to suppress your facial expressions whilst carefully watching the clips; 2. experimenters will be watching your face through a camera located in another room and are trying to guess which film clip you are watching; 3. if you failed to hide your facial expression, you will be asked to fill in a dull 500-question survey as a punishment; and 4. after each film clip ends, fill in a short self-report questionnaire specifying what emotions you experienced according to your true feelings. Accordingly, an interrogation room environment with a punishment threat was provided in addition to highly emotional clips that were chosen to create a high-stake situation where subjects undergoing high emotional arousal are motivated to suppress their facial expressions. It has been previously argued in psychology that these are the necessary conditions for inducing micro-expressions. Although the stake in the present experiments may have been rather low, the results showed that this was a successful scenario in inducing micro-expressions. In total 210 minutes of video data with 1 260 000 frames were obtained. The video data was segmented and labelled by two annotators and matched with subjects' self-reported emotions. The annotators first viewed the video data frame by frame and then with increasing frame rate. The shortest recorded expression was about ⅕ seconds (11 frames at 100 fps) and the average expression length was about ³⁄₁₀ seconds (29 frames at 100 fps).

Figure 1:
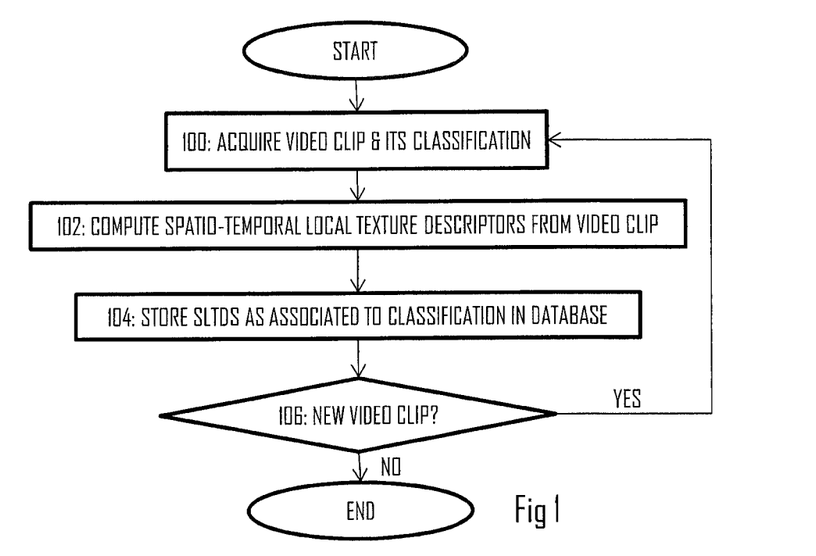
FIG. 1 illustrates an embodiment of a process for initializing a database to comprise reference parameters for video analysis of micro-expressions.

As a result of the time segmentation, a set of reference video clips of the test subjects was obtained, and each reference video clip was labelled in the above-described manner to describe the type of the micro-expression occurring in the video clip. The labelled reference video clips were then applied to a video analysis system comprising a machine vision algorithm to analyse the contents of the reference video clips. FIG. 1 illustrates an embodiment of a process for gathering the training data from the reference video clips. Referring to FIG. 1, the video analysis system acquires a reference video clip in block 100. Block 100 may also comprise detecting the classification of the video clip. The classification may comprise an indicator indicating the presence of a micro-expression in the reference video clip and/or at least one of the following micro-expression types associating the micro-expression to a feeling of the person in the reference video clip: affection, anger, angst, anguish, annoyance, anxiety, apathy, arousal, awe, boldness, boredom, contempt, contentment, curiosity, depression, desire, despair, disappointment, disgust, dread, ecstasy, embarrassment, envy, euphoria, excitement, fear, fearlessness, frustration, gratitude, grief, guilt, happiness, hatred, hope, horror, hostility, hurt, hysteria, indifference, interest, jealousy, joy, loathing, loneliness, love, lust, misery, nervousness, panic, passion, pity, pleasure, pride, rage, regret, remorse, sadness, satisfaction, shame, shock, shyness, sorrow, suffering, surprise, terror, uneasiness, wonder, worry, zeal, zest.

In block 102, the video analysis system computes spatio-temporal local texture descriptor (SLTD) features of the reference video clip, thus obtaining SLTD features that describe spatio-temporal motion parameters of the reference video clip. Block 102 may comprise detecting a face in the reference video clip and focusing the computation of the SLTD features to the detected face. The SLTD features may be computed, for example, by using a state-of-the-art Local Binary Pattern Three Orthogonal Planes (LBP-TOP) algorithm disclosed in G. Zhao, M. Pietikäinen: "Dynamic Texture Recognition Using Local Binary Patterns with an Application to Facial Expressions", IEEE TRANSACTIONS ON PATTERN ANALYSIS AND MACHINE INTELLIGENCE, vol. 29(6), pages 915 to 928, 2007 which is incorporated herein in its entirety as a reference. Alternatively, another algorithm arranged to detect spatio-temporal texture variations in an image sequence comprising a plurality of video frames may be used. The texture may be understood as to refer to surface patterns of the video frames. In yet another embodiment, another feature may be analysed instead of the texture, e.g. colour, shape, location, motion, edge detection, or any domain-specific descriptor. A person skilled in the art is able to select an appropriate state-of-the-art algorithm depending on the feature being analysed, and the selected algorithm may be different from LBP-TOP. For example, the video analysis system may employ a Canny edge detector algorithm for detecting edge features from individual or multiple video frames, a histogram of shape contexts detector algorithm for detecting shapes in the individual or multiple video frames, opponent colour LBP for detecting colour features in individual or multiple video frames, and/or a histogram of oriented gradients for detecting motion in the image sequence. However, in this description we will focus on to the use of the LBP-TOP algorithm for extracting the spatio-temporal texture features.

Upon acquiring the SLTD features in block 102, the video analysis system now has knowledge about the classification of the reference video clip and what type of SLTD features are typical to that class. In block 104, the video analysis system maps the classification to SLTD features and stores the mapping in a database. In block 106, it is determined whether there is a new reference video clip available. If the new reference video clip is available, the process returns to block 100. Otherwise, the process ends.

At least some of the reference video clips may have a high frame rate, e.g. 100 fps, which enables the recording of even the shortest micro-expressions. In order to provide a high accuracy in detecting and classifying a micro-expression, it is advantageous to have the micro-expression to occur in at least three consecutive video frames of the reference video clip. As a consequence, when using the reference video clips having a frame rate of 100 fps, SLTD features of micro-expressions having duration 0.03 seconds (1/33) or higher may be detected reliably. However, even a standard 25 fps camera may be used to record the reference video clips. As such, an image sequence having the frame rate of 25 fps may be sufficient to detect reliably features of at least some of the micro-expressions, e.g. micro-expressions that last longer than 0.12 seconds (3/25). By computing the feature descriptor only from one frame, even a 0.04 seconds (1/25) micro-expression could be detected. A frame interpolation algorithm described below may be used to artificially increase the frame rate of at least the 25 fps reference video clip and, thus, enable reliable detection of the SLTD features of even the shortest micro-expressions in the 25 fps reference video clip. The same algorithm may also be used to downsample a higher frame rate video (e.g. 100 fps) to a lower frame rate (e.g. 25 fps) to reduce possible noise in the feature descriptor.

Figure 2:
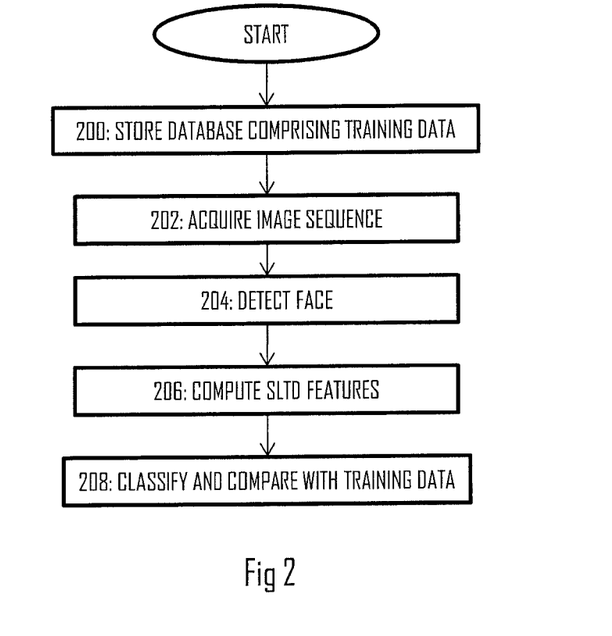
FIG. 2 illustrates an embodiment of a process for detecting micro-expressions from an image sequence.

Let us now consider the operation of the video analysis system in the automated detection of micro-expressions in an arbitrary video clip. FIG. 2 illustrates a flow diagram of such a process carried out by the video analysis system. Referring to block 200, the system stores a representation of the training data in the database. The database may be accessible to a micro-expression classifier of the video analysis system. In block 202, the video analysis system acquires an image sequence comprising a plurality of video frames. In block 204, a face is detected in the plurality of video frames. In block 206, dynamic facial features are extracted from the plurality of video frames by computing SLTD features for the plurality of video frames. In block 208, the micro-expression classifier compares the SLTD features with corresponding SLTD features of the training data in order to determine whether or not a micro-expression has been detected in the image sequence.

In an embodiment, the database stores reference classification parameters acquired as a result of the LBP-TOP algorithm, and the corresponding SLTD features are computed from the video clip during operation by using the same LBP-TOP algorithm. The SLTD features computed from the video clip are then compared with the reference SLTD features in order to determine the presence/absence of a micro-expression in the video clip. In general, the database may store reference SLTD features representing video motion patterns that are typical for each micro-expression, and the corresponding SLTD features are computed from the video clip and then compared with the reference SLTD features in order to determine the presence/absence of the micro-expression. The SLTD features may be acquired by deriving temporal dynamic features in consecutive reference video frames containing the micro-expression, e.g. by analysing spatial and temporal differences between consecutive reference video frames. In acquiring the reference SLTD features and the SLTD features during the operation of the video analysis system, at least one of the following algorithms may be used instead of the LBP-TOP algorithm: Histograms of Oriented Gradients (HOG), HOG 3D, Pyramid HOG, Local Phase Quantization (LPQ), Extended SURF (ESURF), variants of LBP such as Completed LBP (CLBP) or Gabor filters.

The process of FIG. 1 may be carried out by the same video analysis system as the one that actually uses the training data to classify arbitrary video clips during operation according to the process of FIG. 2, or the process of FIG. 1 may be carried out by a different system than the one carrying out the process of FIG. 2. In the latter embodiment, the two different video analysis systems may use the same or substantially similar algorithms for the SLTD feature extraction, or they may use compatible algorithms for the SLTD feature extraction such that the contents of the database are comparable with the parameters extracted from the analysed arbitrary video clip.

The video analysis system according to embodiments of the invention may be configured to detect micro-expressions having duration less than 0.3 seconds (s) or less than 0.2 s. With an assumption that the frame rate used in the video analysis is 100 fps and that for accurate detection motion of a micro-expression should be present in at least three consecutive video frames, even micro-expressions having duration of as low as 1/33 s~0.03 s may be detected with the present video analysis system. However, with a more relaxed requirement that the micro-expression should be present in at least one video frame, the present invention may detect micro-expressions having a duration of 0.01 s or higher.

Figure 3:
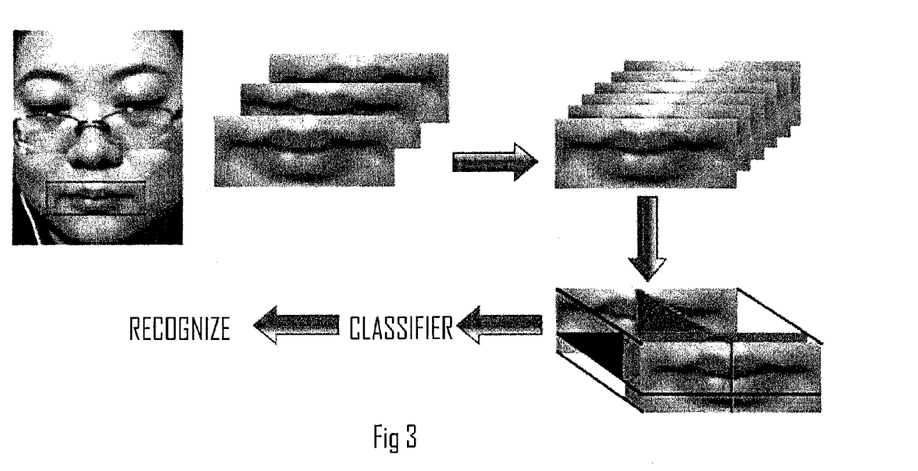
FIG. 3 illustrates visually the operation of the video analysis.
Figure 4A:
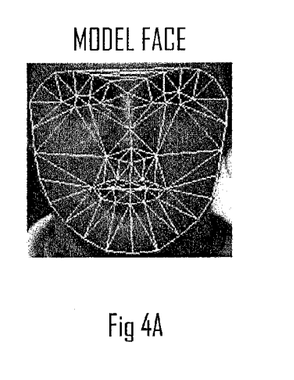
FIGS. 4A and 4B illustrate facial feature points of a model face and a face contained in video frames being analysed.
Figure 4B:
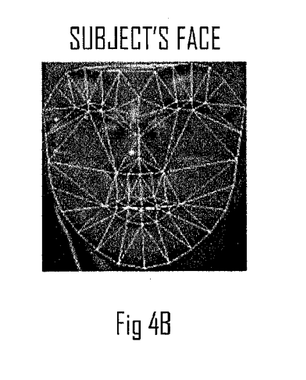
Figure 5:
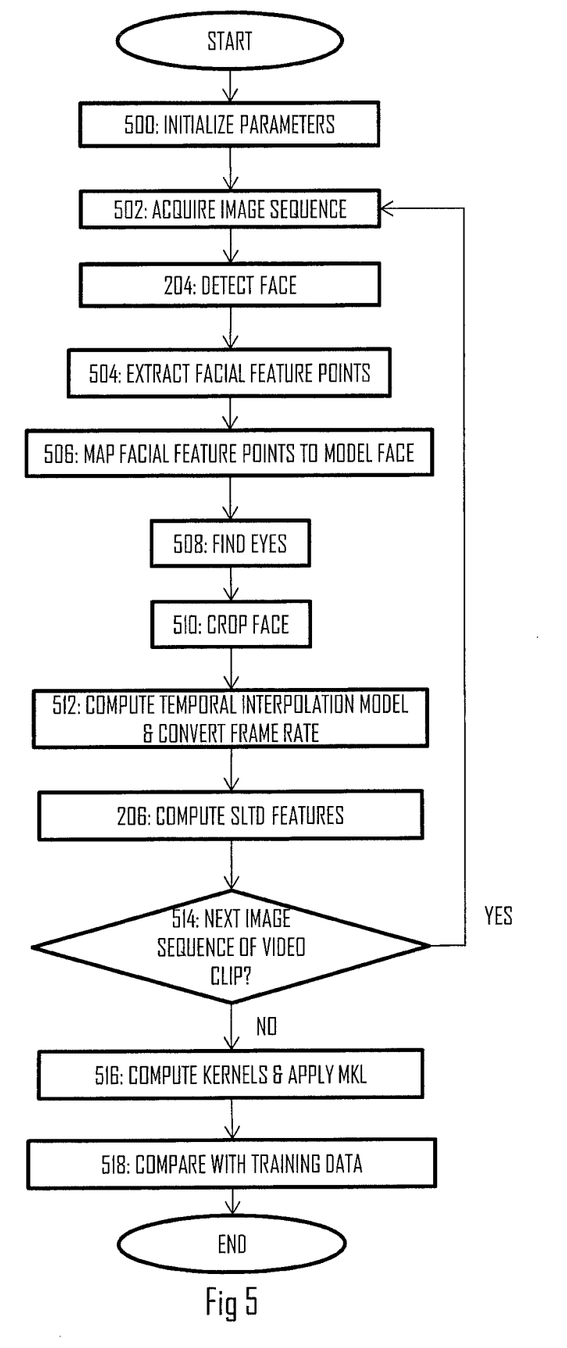
FIG. 5 illustrates in detail an embodiment of a process for processing an image sequence during the video analysis.

Let us now describe a more detailed embodiment of a process for detecting facial micro-expressions with reference to a flow diagram of FIG. 5 and a pictorial illustration of FIGS. 3, 4A, and 4B. This embodiment utilizes a temporal interpolation model (TIM) together with machine learning methods to recognise spontaneous facial micro-expressions with high accuracy. Referring to FIG. 5, parameters are initialized in block 500. Initialized parameters may comprise a target frame count for the TIM T={10, 15, 20, 30}, and parameters for SLTD feature extraction Γ (x,y,z)=(8×8×1, 5×5×1, 8×8×2, 5×5×2), where x defines the number of rows of a video frame to which the SLTD feature extraction is divided, y defines the number of columns of the video frame to which the SLTD feature extraction is divided, and z defines the number of temporal blocks of video frames to which the SLTD feature extraction is divided. Each temporal block may comprise a plurality of video frames, e.g. 2, 3, 4, 5, 6, 7, or 8 video frames. As a consequence, Γ (x,y,z) defines the spatio-temporal resolutions for the SLTD feature extraction.

In block 502, an image sequence $c_i$ is acquired. The image sequence may comprise a subset of video frames of the video clip C, e.g. three video frames as illustrated in top left of FIG. 3. For example, with 100 fps $c_i$ may be 4 to 33 frames long for $\frac{1}{25}$ s to $\frac{1}{3}$ s long micro-expressions. The actual value of $c_i$ may be determined according to the frame rate of the video clip, for example. Then, the face may be detected in the first video frame of the image sequence (block 204). The detection of the face may be based on detecting the eyes, nose, and/or the mouth. Then, facial feature points h are detected from the face of the first video frame (block 504). The facial feature points h may be attached to unique facial features of the person illustrated in the video frame, e.g. some points may follow the outlines of the face, the nose, the eyes, and the mouth. FIGS. 4A and 4B show facial feature points for two faces: a model face stored in the database and the face of a subject contained in the first video frame. As apparent from FIGS. 4A and 4B, the facial feature points define the unique facial features of the persons. The facial feature points may be acquired by using an Active Shape Model (ASM) algorithm. ASMs are statistical models of the shape of an object that are iteratively deformed to fit an example of the object. The ASM starts the search from a mean shape aligned to the position and size of the face determined by a face detector and repeats until convergence: 1. suggest tentative shape by template matching of image texture around points to change feature point locations; and 2. fit tentative shape to the global shape model. In an embodiment, h=68 resulting in 68 facial feature points. However, another value of h may be equally applied. The facial feature points may be represented as $\psi=\{(a_1, b_1), \ldots (a_h, b_h)\}$.

Then, the face is normalized by mapping the facial feature points computed for the first video frame to the facial feature points of the model face (block 506). Normalizing the face reduces the effect of personal variances on the micro-expression detection, thus improving the detection accuracy. Using the facial feature points ψ shown in FIG. 4B, a Local Weighted Mean (LWM) transformation of the first video frame may be computed. LWM computes the weighted mean of all polynomials passing over each facial feature point by setting the value of an arbitrary facial feature point (x, y) as:

$$f(x, y) = \frac{\sum_{h=1}^{N} V\left(\sqrt{(x-x_h)^2 + (y-y_h)^2} \big/ R_n\right) S_h(x, y)}{\sum_{h=1}^{N} V\left(\sqrt{(x-x_h)^2 + (y-y_h)^2} \big/ R_n\right)} \quad (1)$$

where $S_h(x, y)$ is the polynomial with n parameters passing through a measurement for control point $(x_h, y_h)$ and n−1 other measurements nearest to it, V is a weight and $R_n$ is the distance of $(x_h, y_h)$ from its $(n-1)^{th}$ nearest control point in the model image (FIG. 4A). In an embodiment, the same transformation is applied to a number of others frames $p_{h,2} \ldots p_{h,s}$. The use of the same transformation may be used when the face or object is not moving substantially between consecutive the video frames. In another embodiment, a new transformation is computed for each video frame. More information on the LWM algorithm as applied to the image and video processing may be found in the literature. Basically, the operation of the LWM or another corresponding mapping algorithm may be understood as providing a transformation function $\zeta=LWM(\psi,\omega, \rho_{h,1})$ that maps the facial feature points ψ of the first video frame $\rho_{h,1}$ to the facial feature points ω of the model image. When the transformation function $\zeta$ has been found, the transformation function $\zeta$ may be applied to the other video frames $\rho_{h,2}$ to $\rho_{h,s}$ of the image sequence (in block 506).

Now that the face has been normalized in block 506, the eyes may be detected from the normalized video frames (block 508) and the face may be cropped (block 510) as a result of the eye detection. As the video analysis system attempts to detect facial micro-expressions, other pixels of the video frames may be removed. The eyes may be detected by using a Haar eye detector, for example, resulting in eye locations $E(F_h)=\{(x_{h,l}, y_{h,l}), x_{h,r}, y_{h,r})\}$ for the left eye and the right eye, respectively. Then, the distance between the eyes may be computed as $$\delta_i = \sqrt{(x_{h,l}-x_{h,r})^2 + (y_{h,l}-y_{h,r})^2} \quad (2)$$

The distance between the eyes may be used in the cropping by setting a topleft pixel to $(x_{h,l}, y_{h,l}+0.4(y_{h,l}-y_{h,r})-0.6(x_{h,l}-h_{h,r})$, height of the cropped frame to $2.2\delta_h$, and width to $1.8\delta_h$.

For the cropped video frames, a frame rate conversion may be made. In the embodiment of FIG. 5, the frame rate conversion comprises interpolating new video frames between the video frames of the image sequence by using a temporal interpolation model (TIM) in block 512 (see also top right of FIG. 3).

In an embodiment, the original video frames are maintained, and new video frames are added between the original video frames.

In an embodiment, a completely new image sequence is computed from the original video frames. As a consequence, the interpolated image sequence consists of new video frames computed from the original video frames, and the original video frames are discarded after the interpolation.

It should, however be appreciated that in other embodiments the frame rate conversion may comprise removal of at least some of the video frames of the image sequence in order to reduce the frame rate. In an embodiment, the TIM may utilize temporal graph embedding described in Z. Zhou, G. Zhao, and M. Pietikäinen: "Towards a Practical Lipreading System", Proceedings of IEEE Conference on Computer Vision and Pattern Recognition, 2011, which is incporporated herein as a reference in its entirety. Zhou et al. utilize the TIM in a lipreading synthesis, while the present embodiment utilizes the TIM in the detection of micro-expressions. An embodiment of the TIM is described in greater detail below. The TIM may be computed for all θϵT to acquire a frame-rate-converted image sequence $\xi_{i,\theta}$ comprising θ video frames. When T comprises multiple values, e.g. as described above, a plurality of frame-rate-converted image sequence $\xi_{i,\theta}$ are computed.

Then, block 206 may be executed, and the SLTD features may be computed. The SLTD features may be computed for all pϵΓ (for all spatio-temporal neighbourhood sizes defined in Γ) and for all target frame counts θϵT. The length of a SLTD feature vector may be defined by M. Thus, a set of SLTD features are acquired as $\mu_{i,p,\theta}(\xi_{i,\theta})=\{q_{i,p,\theta,1}, \ldots, q_{i,p,\theta,M}\}$. The SLTD features may describe spatial and temporal differences between the video frames, by computing spatial and temporal differences within the neighbourhoods defined by the values of $\Gamma$. When the SLTD features have been computed (block 206 completed), it is evaluated in block 514 whether the video clip comprises a next image sequence. If there is a next image sequence, the process returns to block 502.

In an embodiment, the algorithm operates according to a sliding window scheme such that the subsequent image sequence may comprise some of the video frames of the previous image sequence. A sliding window offset defining the number of discarded old video frames and the number of new video frames included in the next image sequence may be selected according to the implementation.

If the image sequence is the last one of the video clip, the process proceeds to block 516. In another embodiment, the procedure splits into a plurality of branches in block 514, and the plurality branches are executed in parallel. For example, block 516 may be started while the processing of the next image is started in block 502. In block 516, kernels for use by a classifier are computed. The kernels may comprise a histogram intersection kernel and/or at least one polynomial kernel of a determined degree. In an embodiment, multiple kernel learning (MKL) is used. Given a set of training parameters $H=\{(x_1,l_1)\ldots(x_n,l_n)\}$ and set of kernels $\{K_1 \ldots K_M\}$ where $K_k \in R^{n \times n}$ (real numbers) and $K_k$ is positive semi-definite, the MKL learns weights for linear/non-linear combinations of the kernels over different domains by optimising a cost function $Z(K,H)$ where K is a combination of basic kernels. In an embodiment, we combine polynomial kernels POLY of degrees 2 and 6 and a histogram-intersection kernel HISINT with different SLTD feature values $p \in \Gamma$ over different temporal interpolations $\theta \in T$ where $$\text{POLY}(q_{j,r}, q_{k,r}, d) = (1 + q_{j,r} q^T_{k,r})^d \quad (3)$$

$$\text{HISINT}(q_{j,r}, q_{k,r}) = \Sigma_{a=1}^{b} \min\{q_{j,r}^a, q_{k,r}^a\} \quad (4)$$

where d, is the desired degree of the polynomial kernel, $q_{j,r}$ and $q_{k,r}$ represent the pixel values for which the kernel is computed, $r=(m, \theta, p)$ and b is the number of bins in $q_{j,r}$, $q_{k,r}$. In an embodiment, the following kernels K may be computed:

$$K = \{\forall j,k,m,\theta,p,c_j \in C \wedge c_k \in C \wedge m=1$$
$$M \wedge \theta \in T \wedge p \in \Gamma \wedge R=(m,\theta,p) | \text{HISINT}(q_{j,r}, q_{k,r}),$$
$$\text{POLY}(q_{j,r}, q_{k,r}, 2), \text{POLY}(q_{j,r}, q_{k,r}, 6)\} \quad (5)$$

Equations (3) and (4) compute different types of comparisons between the training parameters and the SLTD features computed from the video clip (block 518), and if the cost function Z taking into account these different comparisons indicates that a sufficient similarity is found between the video clip and the training parameters in block 518, the MKL may output an indicator indicating the detection of the micro-expression. The indicator may be output through a user interface of the video analysis system, e.g. it may be displayed on a display unit of the video analysis system.

It should be appreciated that other embodiments use another state-of-the-art classifier, e.g. random forest (RF), support vector machine (SVM) classifier, ensembles of classifiers, Bayesian networks or nearest neighbour classifiers. The operation of the classifier may be two-phased. In the first phase, the classifier may simply determine whether or not it has detected a micro-expression and output a corresponding indicator. In a second phase, the classifier may detect the type of the detected micro-expression, provided that the micro-expression was detected in the first phase. The second phase may be triggered by a user input after the first phase has been completed. In another embodiment, the second phase is triggered automatically when the result of the first phase is a positive detection of a micro-expression. With respect to the second phase, the training data of each micro-expression stored in the database may comprise a type indicator indicating the type of the micro-expression. The set of micro-expression types may be defined by $L=\{l_1, \ldots, l_n\}$. The second phase of the classifier may comprise determining the micro-expression which provides the highest similarity with the SLTD features computed from the video clip and, thereafter, the classifier may read the type indicator of the determined micro-expression and output the type indicator for example through a user interface. Dividing the automated classification task into two pipelined phases enables to optimise the phases separately and to tailor L for the second phase according to a specific application, e.g. lie detection, whilst retaining the original optimised first phase. Further, because data labelling for the second phase requires one-step deeper analysis, it may be subject to a greater labelling error. By separating the two phases it is possible to avoid a subjective labelling of expressions of the second phase from affecting the performance of the more objective recognition in the first phase.

Figure 6:
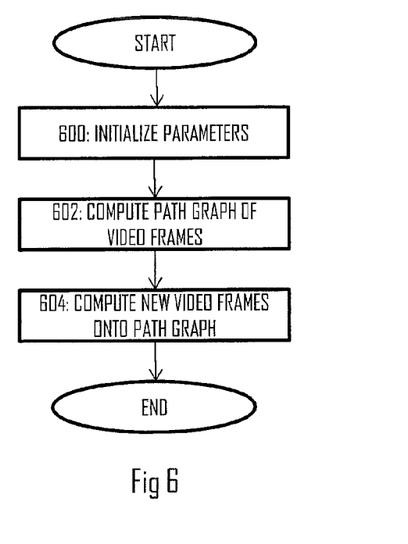
FIG. 6 illustrates an embodiment of a process for interpolating new video frames into the image sequence.

Let us now describe the TIM in greater detail with reference to FIG. 6. As described above, the TIM may use temporal graph embedding to interpolate new video frames or images at arbitrary positions within the image sequence. This allows us to input a sufficient number of video frames for the SLTD feature computation to enable computation of SLTD features of even the shortest micro-expressions by using only a few frames of the initial image sequence. It also enables us to achieve more statistically stable SLTD feature extraction results by increasing the number of frames used for the SLTD computation. Thus, high detection accuracy may be achieved by using a standard 25 fps camera, for example. To the knowledge of the inventors, this is the first time when such a method has been used for recognising facial expression let alone facial micro-expressions. We view the video clip of a micro-expression as the image sequence which has been sampled along a curve or a graph and create a continuous function representing the video clip as a path graph $P_n$ having n vertices or nodes. Each vertex represents a video frame of the original image sequence. Edges connecting the vertices are represented by an adjacency matrix $W \in \{0,1\}^{n \times n}$ with $W_{i,j}=1$ if $|i-j|=1$ and 0 otherwise. The path graph $P_n$ is mapped to a curve that minimises the distance between edge-connected vertices. Let $y=(y_1, y_2, \ldots, y_n)^T$ be the map. The following function will be minimized in order to obtain y:

$$\Sigma_{i,j}(y_i-y_j)^2 W_{i,j}, i,j=1,2,\ldots,n \quad (6)$$

The minimization is equivalent to calculating eigenvectors of a Laplacian graph L of $P_n$. L may be defined as $L=D-W$, where D is a diagonal matrix with the $i^{th}$ diagonal entry computed as $D_{ii}=\Sigma_{j=1}^{n} W_{ij}$. L has n-1 eigenvectors $\{y_1, y_2, \ldots, y_{n-1}\}$ with non-zero eigenvalues $\lambda_1 < \lambda_2 < \ldots < \lambda_{n-1}$, and the $u^{th}$ element (u=1, 2, \ldots, n) of $y_k$ (k=1, 2, \ldots, n-1) may be determined as:

$$y_k(u) = \sin\left(\frac{\pi k u}{n} + \frac{\pi(n-k)}{2n}\right) \quad (7)$$

If we replace u by t=u/n in Equation (7), $y_k$ may be presented as a set of points on the curve described by function $$f_k^n(t) = \sin(\pi k t + \pi(n-k)/n), t \in \left[\frac{1}{n}, 1\right]$$

sampled at t=1/n, 2/n, ..., n/n. It can be seen that the temporal relations between the video frames are governed by the curve, which provides a justification to make an assumption that the unseen images between the consecutive video frames of the image sequence represent also follow the curve defined by the following function:

$$F^n(t) = \begin{bmatrix} f_1^n(t) \\ f_2^n(t) \\ \vdots \\ f_{n-1}^n(t) \end{bmatrix} \quad (8)$$

This assumption may be used to derive a way to connect video frames and the curve defined by $F_n$. Given an image sequence with n frames, we denote the visual features extracted from the frames as $\{\xi_i \in R^m\}_{i=1}^n$ where m is the dimension of the visual feature space. Note that when the features are simply defined as the raw pixel values, as in our case, $\xi_i$ is a vectorized $i^{th}$ video frame. First, a projection is established from $\xi_i$ to points defined by $F^n(1/n), F^n(2/n), \ldots, F^n(1)$. Typically, n<<m and it may be assumed that vectors $\xi_i$ are linearly independent. A mean vector $\bar{\xi}$ is calculated and removed from $\xi_i$. The mean-removed vectors may be denoted by $x_i = \xi_i - \bar{\xi}$. Based on the assumption on $\xi_i$, matrix $X=[x_1, x_2, \ldots, x_n]$ representing the mean-removed video frames of the original image sequence has a rank equal to n−1. Recall that we represent the video frames by graph $P_n$ with the adjacency matrix W. By using the linear extension of graph embedding, we can learn a transformation vector w that minimizes the following function:

$$\Sigma_{i,j}(w^T x_i - w^T x_j)^2 W_{i,j}, i,j=1,2,\ldots,n \quad (9)$$

Vector w may be computed as an eigenvector of the following generalized eigenvalue problem:

$$XLX^T w = \lambda' XX^T w \quad (10)$$

The problem may be solved by using a singular value decomposition (SVD) on X to result in $X=U\Sigma V^T$ which is a common form of a SVD. Then, the problem may be modified into a conventional eigenvalue problem $$Av = \lambda' v$$

$$A = (QQ^T)^{-1}(QLQ^T)$$

$$Q = \Sigma V^T \quad (11)$$

such that w=Uv. Q and A are both full rank. Let $\{v_1, v_2, \ldots, v_{n-1}\}$ be eigenvectors of A with corresponding eigenvalues $\lambda'_1 < \lambda'_2 < \ldots < \lambda'_{n-1}$. Then, we acquire from Equation (11) for each $v_k$ (k=1, 2, ..., n−1):

$$(QQ^T)^{-1}(QLQ^T)v_k = \lambda'_k v_k$$

$$\rightarrow LQ^T v_k = \lambda'_k Q^T v_k \quad (12)$$

It can be seen that vectors $Q^T v_k$ are eigenvectors of L. Therefore, $\lambda_k = \lambda'_k$, and $Q^T v_k = m_k y_k$ where $m_k$ is a scaling constant and it may be evaluated as a ratio of the first element of $Q^T v_k$ to the first element of $y_k$ as:

$$m_k = \frac{\sum_{i=1}^{n-1} Q_{i1} v_k(i)}{y_k(1)} \quad (13)$$

Let M be a diagonal matrix with $M_{kk}=m_k$, $Y=[y_1, y_2, \ldots, y_{n-1}]$ and $\phi=[v_1, v_2, \ldots, v_{n-1}]$. From definitions $\lambda_k=\lambda'_k$, and $Q^T v_k = m_k y_k$ and $Q=\Sigma V^T = U^T X$ we have $$Q^T \Phi = (U^T X)^T \Phi = YM \quad (14)$$

Recall that vectors $y_k$ are defined by a set of trigonometric functions (Equation (7)), which results in a matrix representation of Y as:

$$Y = [y1, y2, \ldots, yn-1] \quad (15)$$

$$= \begin{pmatrix} f_1^n(1/n) & \cdots & f_{n-1}^n(1/n) \\ \vdots & \ddots & \vdots \\ f_1^n(n/n) & \cdots & f_{n-1}^n(n/n) \end{pmatrix}$$

And according to Equation (8), $Y^T=[F^n(1/n), F^n(2/n), \ldots, F^n(n/n)]$. Thus, a new image $\xi$ may be interpolated by computing:

$$\xi = UMF^n(t) + \bar{\xi} \quad (16)$$

The interpolated image sequence may be computed as $$\xi_{i,\theta} = UMF^n(t) + \bar{\xi}_{i,\theta} \quad (17)$$

for all $\theta$ and $c_i$. Then, the SLTD parameters with all combinations of them with $\Gamma$ may be computed for the classification purposes.

Referring to FIG. 6, the interpolation process may be started by initialising the parameters (block 600), e.g. $\theta$ which defines the total number of video frames after the interpolation. Then, the necessary parameters related to the path graph may be computed, e.g. matrices U and M and mean vector $\bar{\xi}_{i,\theta}$. This may be understood as computing a path graph from the original video frames (block 602). Then, new video frames may be derived by computing Equation (17) (block 604).

The inventors recognized that the interpolated video frames preserve well the characteristics of the original video frames whilst smoothing the temporal profile. As a consequence, the interpolation was found to provide new video frames accurately modelling the behaviour of the original video frames whilst removing noise contained in the original video frames. Because of the noise reduction feature, the interpolation model may be used in reducing the frame rate when the frame rate of the original image sequence is high, e.g. 100 fps. The inventors discovered that the advantages gained by the noise reduction may exceed the disadvantages of the frame rate reduction such that the accuracy of the classification may be improved by reducing the frame rate.

Let us now discuss briefly some experiments the inventors carried out. The micro-expression recognition system was evaluated by leave-one-subject-out evaluation on two corpora. To compute the SLTD features, the experiments use the LBP-TOP algorithm. For MKL, the block sizes given above were used. Non-MKL classification results are reported with SLTD blocks of 8×8×1, where the image is split in 8×8 blocks in the spatial domain. SVM results without MKL use a polynomial kernel of degree 6. The results were reported for combinations of parameters p∈Γ and θ∈T and classifiers $\phi=\{SVM, MKL, RF\}$ that gave the best leave-one-subject-out results. RF is the Random Forest decision tree ensemble classifier. The video analysis system may be used for a general detection task by classifying a sliding window of facial frames. The experiments are equivalent to off-line runs of the sliding window classifier and do not require manual segmentation. First experiment used a York Deception Detection Test (YorkDDT) corpus which formed the first set of above-described training data, as described above. YorkDDT poses several challenges common in practical micro-expression recognition. First, the data is spontaneous and hence has high variability. Second, the subjects are constantly talking, so facial movement is not limited to facial expressions. Third, the resolution and frame rate of the camera are very limited. Despite these inherit challenges in the corpus, we show that using the methods described herein we can successfully build a subject-independent micro-expression recognition system using this limited corpus. Table 1 shows a summary of the leave-one-subject-out results on the YorkDDT corpus. The first phase of the MKL distinguishes micro-expressions from other facial activity. For the purpose of this experiment, 18 image sequences were selected randomly from sections of the video clips that did not contain any micro-expressions, but were allowed to contain speaking or facial expressions that were not micro-expressions. Using $SLTD_{8 \times 8 \times 1}$ with an SVM we achieve 65% accuracy. By combining temporal interpolation of all expressions to 10 frames with the MKL kernels computed on the SLTD block sizes given above we achieve 83% leave-one-subject-out accuracy. Interpolating to over 10 frames was not found to yield any significant improvement. This may be because the original videos were fairly short, so interpolating to more than 10 frames only adds redundant data and leads to deteriorating performance. However, we see a very significant boost of 15% by normalising all sequences to 10 frames. The second phase recognises the type of a micro-expression. For the YorkDDT corpus we have two sets of labels: emotional vs. non-emotional and deceptive vs. truthful. For distinguishing deceptive from truthful micro-expressions, without MKL or TIM we achieve a below-chance accuracy 47.6% with an SVM trained on $SLTD_{8 \times 8 \times 1}$. By combining TIM to 10 frames and MKL with our selection of SLTD block sizes and kernels we boost the result to 76.2%. Again, interpolating to a higher number of frames did not yield any significant improvement. Out of the three classifiers in $\phi$, MKL constantly yielded the best result. Combining the first and second phase of the MKL corresponds to pipelining the videos of positive detections from the first phase to be classified in the second phase, as described above. Since 83% of the micro-expressions were correctly detected using MKL with TIM to 10 frames, we can detect and classify deceptive/truthful and emotional/unemotional micro-expressions with 63.2% and 59.3% accuracy respectively. Such a pipelined system could be used to detect lies by setting the first phase to detect the presence of the micro-expression and classifying the micro-expression in the second phase as lie or as another micro-expression.

The second set of training data, i.e. the SMI corpus (SMIC), was acquired from the 100 fps videos, as described above. In our new SMIC, we addressed the resolution and frame rate problems of the YorkDDT corpus. The most notable difference in the results compared to the YorkDDT corpus is that whereas TIM still gave high performance boosts, MKL with different combinations of kernels K, TIMs $\theta \in T$ and parameters $p \in \Gamma$ did not always offer the best performance, but was occasionally outperformed by decision tree ensemble classifier Random Forest. This demonstrates that the optimal classifier depends on the data and highlights that alternative classifiers should always be investigated. Therefore, the embodiments of the invention are not restricted to the use of MKL. Fusion between RF and MKL would potentially yield even better performance. A notable similarity to the experiments on YorkDDT is that TIM10 continued performing well. This is even though the frame rate quadrupled from 25 fps in YorkDDT to 100 fps in SMIC. TIM to 10 frames in fact results in frame rate reduction. This indicates that a higher frame rate may produce redundant data or noise that deteriorates the performance of the classifier. In the first phase, micro-expressions were distinguished from other facial data. As for the YorkDDT corpus, there were selected 77 image sequences of the data that did not contain facial micro-expressions but could contain other facial movement. By running an SVM on this data, 70.3% micro-expression detection accuracy was achieved. Using MKL, the results were improved slightly. The highest improvement to 74.3% was achieved by using the Random Forest decision tree classifier together with TIM to 10 frames. In the second phase 2, the recognised micro-expressions were classified as negative vs. positive using 18 and 17 samples respectively. With SVM only, a rather poor accuracy of 54.2% (50% chance) was achieved, but it was improved by incorporating MKL and temporal interpolation up to 71.4%.

In an ideal case, spontaneous micro-expression recognition would work with standard cameras without special hardware. In yet another experiment, it was shown how the temporal interpolation method enables high recognition accuracy even when using a standard 25 fps frame rate. The 100 fps SMIC corpus was frame-rate-reduced to 25 fps by selecting every 4th frame from the original data. This resulted in image sequences of length between 2 and 8 frames. We notice a 5.3% increase in accuracy for the first phase to 70.3% from using an MKL kernel set instead of pure SVM. The best results were achieved by combining the Random Forest classifier with a temporal interpolation to 20 frames, yielding 78.9% accuracy. This compares favourably with the human micro-expression recognition accuracy reported in the literature. For the second phase classification, the results were improved by using MKL and TIM to 15 frames (64.9%), but they are not quite able to match the performance achieved with the full 100 fps frame rate (71.4%). For the first phase detection, however, even with ¼ less frames it was possible to match and even slightly outperform the accuracy achieved with the full data from the 100 fps camera. It was further experimented on how the recognition rate varies with frame rate. It was noted that the result is relatively stable using TIM to 20 frames. Without interpolation we get a more significant drop in accuracy with a lower frame rate. We observed the peak accuracy when reducing the frame rate of the corpus to 50 fps. This suggests that by using TIM, a camera with lower frame rate, e.g. 25 fps, is sufficient for accurately classifying micro-expressions.

The above-described algorithm may be realized as a real-time micro-expression detection algorithm by using state-of-the-art computers and computer program codes.

It should be appreciated that while the embodiments described above compute the spatio-temporal descriptors of the training data and the image sequence, the present invention is applicable to systems that use only the spatial descriptors, e.g. the short spontaneous micro-expressions may be detected even from a single frame. As a consequence, the present invention may be realized by an apparatus comprising at least one processor and at least one memory including a computer program code and a database comprising training data for a micro-expression classifier. The training data comprises reference descriptors for at least one spontaneous facial micro-expression having the above-mentioned duration, e.g.

less than 0.06 seconds. The reference descriptors associated with the micro-expression describe spatial features at least one reference video frame containing the micro-expression. The at least one memory and the computer program code are configured, with the at least one processor, to cause the apparatus to: acquire an image sequence comprising a plurality of video frames; detect a face in the plurality of video frames; extract facial features from at least one video frame by computing spatial descriptors for the at least one video frame; and compare the computed spatial descriptors with the reference descriptors and determine on the basis of their similarity whether or not the image sequence comprises a micro-expression.

In a more generic concept, the present invention may be realized by an apparatus comprising at least one processor; and at least one memory including a computer program code, wherein the at least one memory and the computer program code are configured, with the at least one processor, to cause the apparatus to acquire an image sequence and to detect a spontaneous micro-expression having a duration less the above-described duration, e.g. 0.06 seconds, from the image sequence.

Figure 7:
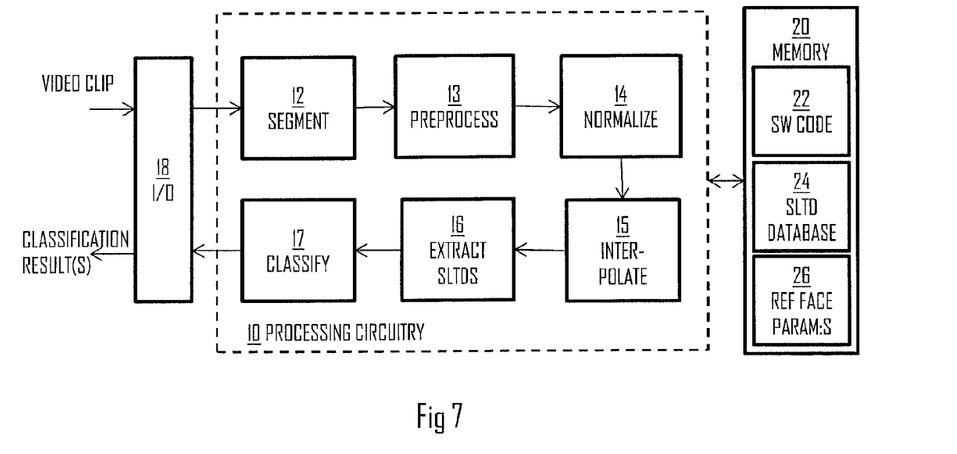
FIG. 7 illustrates an embodiment of an apparatus configured to carry out the video analysis for detecting micro-expressions.

An embodiment provides an apparatus comprising at least one processor and at least one memory including a computer program code, wherein the at least one memory and the computer program code are configured, with the at least one processor, to cause the apparatus to carry out the micro-expression detection algorithm according to any one of the above-described embodiments. FIG. 7 illustrates an embodiment of such an apparatus. The apparatus may be a computer, a personal computer (PC), a laptop, a tablet computer, a palm computer, or an application-specific apparatus such as a lie detection apparatus, a public security apparatus, etc.

The apparatus may comprise an input/output (I/O) interface 18 configured to interface with peripheral devices such as a user interface and a video camera. The user interface may comprise input devices such as a keyboard, a mouse, a microphone, the video camera, and it may comprise output devices such as a display unit and a loudspeaker. The video frames to be analysed may input to the I/O interface 18 from the video camera or a memory, e.g. a memory stick. In an embodiment, the video is streamed from the video camera as a live stream. The video camera may be integrated into the apparatus, or it may be detachably connected to the apparatus via a Universal Serial Bus (USB) or Firewire connection, for example.

The apparatus further comprises a processing circuitry 10 configured to carry out the video analysis algorithms used in the micro-expression detection algorithm. Furthermore, the apparatus may comprise a memory 20 storing computer program code 22 defining the operation of the processing circuitry through a computer process. The memory 20 may further store a database comprising the reference SLTD features 24 and the reference facial parameters 26 defining the facial features of the reference face from which the reference SLTD features 24 are computed.

The processing circuitry 10 may comprise a segmentation circuitry 12 arranged to segment the video clip into a plurality of image sequences. The length of the image sequences and the video frames in each image sequence may be determined in the above-described manner. The subsequent processing in the processing circuitry 10 may be directed to each image sequence separately. A pre-processing circuitry 13 may be configured to pre-process the image sequences, e.g. by initializing the above-described parameters (block 500), detecting face from the video frames (block 204), extracting the feature points (block 504), etc. Then, a normalization circuitry 14 may normalize the detected facial feature points to reference facial feature points 26 acquired from the memory 20, thus outputting normalized video frames.

An interpolation circuitry 15 may carry out the above-described frame rate conversion to the target frame rate. The interpolation circuitry may execute the temporal interpolation process of FIG. 6, for example. As a result, the interpolation circuitry 15 outputs a frame-rate-converted image sequence.

In some embodiments, the normalization and the interpolation circuitries 14 and 15 are omitted from the processing circuitry 10.

An SLTD extraction circuitry 16 may carry out the LBT-TOP or another corresponding algorithm to compute the dynamic features of the image sequence.

A classification circuitry 17 may be configured to carry out the comparison between the SLTD features computed by the SLTD extraction circuitry and the reference SLTD parameters 24 acquired from the memory 20. The classification circuitry may employ one of the following algorithms: MKL, SVM, RF, or it may employ a plurality of the classification algorithms. The operation of the classification circuitry may be two-phased in the above-described manner: first decision between detection and no detection of a micro-expression and, then, detection of the type of the micro-expression, if such has been detected. The classification circuitry may output the classification results to the I/O circuitry 18, and the I/O circuitry 18 may be configured to output the classification results through the user interface.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to video analysis systems. The algorithms or protocols used by the system, the specifications of video analysis systems, their components and features develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for automated video analysis in a video analysis system, the method comprising:
   storing a database comprising training data for a micro-expression classifier, wherein the training data comprises spatio-temporal local texture reference descriptors for a plurality of spontaneous facial micro-expressions, wherein spatio-temporal local texture reference descriptors associated with a micro-expression describe temporal dynamic features in consecutive reference video frames containing the micro-expression;
   acquiring an image sequence comprising a plurality of video frames;
   detecting a face in the plurality of video frames;
   extracting dynamic facial features from the plurality of video frames by computing spatio-temporal local texture descriptors for the plurality of video frames, wherein the spatio-temporal local texture descriptors describe temporal dynamic features acquired through comparison of a plurality of consecutive video frames of the image sequence; and
   comparing the computed spatio-temporal local texture descriptors with the spatio-temporal local texture reference descriptors and determining on the basis of their similarity whether or not the image sequence comprises a micro-expression.

2. The method of claim 1, further comprising:
   determining a target frame rate for the image sequence; and
   converting a frame rate of the image sequence to the target frame rate.

3. The method of claim 2, wherein the frame rate conversion comprises interpolating temporally new video frames between the plurality of video frames of the image sequence, and wherein the spatio-temporal local texture descriptors are computed also for the interpolated new video frames.

4. The method of claim 3, wherein the interpolation of the new video frames comprises:
   computing a path graph from the image sequence, wherein the path graph represents minimized distances between consecutive video frames in the image sequence; and
   generating new video frames onto the path graph between the plurality of video frames of the image sequence.

5. The method of claim 4, wherein the generation of the new video frames comprises determining a transformation vector w that minimizes the following function:

$$\Sigma_{i,j}(w^T x_i - w^T x_j)^2 W_{i,j}, \; i,j = 1, 2, \ldots, n,$$

where n is the number of video frames in the image sequence, xi and xj represent video frames in the image sequence, $W_{i,j}$ is an element of an n×n adjacency matrix with $W_{i,j} = 1$ if |i−j|=1 and 0 otherwise, and T represents transpose operation.

6. The method of claim 5, further comprising solving the minimization of the function through an eigenvalue problem formalization.

7. The method of claim 1, further comprising:
   upon detecting in a first classification phase, as a result of said comparison, occurrence of a micro-expression on the face, outputting an indicator indicating the detection of the micro-expression; and
   as a result of the detection of the micro-expression, triggering a second phase comprising classifying a type of the micro-expression and outputting an indicator indicating the type of the micro-expression.

8. The method of claim 1, wherein the spatio-temporal local reference descriptors represent temporal dynamic features of micro-expressions having duration between 0.3 and 0.04 seconds.

9. The method of claim 1, further comprising:
   storing in the database reference facial feature parameters of a reference face;
   normalizing facial feature parameters of the face detected in the video frames to the reference facial feature parameters; and
   computing the spatio-temporal local texture descriptors from the video frames having the normalized facial feature parameters.

10. The method of claim 1, wherein the method is used in at least one of the following applications executed in the video analysis system: an application arranged to detect suspicious behaviour of persons, a security application, and a business negotiation application.

11. An apparatus comprising:
    at least one processor; and
    at least one memory including a computer program code and a database comprising training data for a micro-expression classifier, wherein the training data comprises spatio-temporal local texture reference descriptors for a plurality of spontaneous facial micro-expressions, wherein spatio-temporal local texture reference descriptors associated with a micro-expression describe temporal dynamic features in consecutive reference video frames containing the micro-expression,
    wherein the at least one memory and the computer program code are configured, with the at least one processor, to cause the apparatus to:
    acquire an image sequence comprising a plurality of video frames;
    detect a face in the plurality of video frames;
    extract dynamic facial features from the plurality of video frames by computing spatio-temporal local texture descriptors for the plurality of video frames, wherein the spatio-temporal local texture descriptors describe temporal dynamic features acquired through comparison of a plurality of consecutive video frames of the image sequence; and
    compare the computed spatio-temporal local texture descriptors with the spatio-temporal local texture reference descriptors and determine on the basis of their similarity whether or not the image sequence comprises a micro-expression.

12. The apparatus of claim 11, wherein the at least one memory and the computer program code are configured, with the at least one processor, to cause the apparatus to:
    determine a target frame rate for the image sequence; and
    convert a frame rate of the image sequence to the target frame rate.

13. The apparatus of claim 12, wherein the at least one memory and the computer program code are configured, with the at least one processor, to cause the apparatus to interpolate temporally new video frames between the plurality of video frames of the image sequence, and to compute the spatio-temporal local texture descriptors also for the interpolated new video frames.

14. The apparatus of claim 13, wherein the at least one memory and the computer program code are configured, with the at least one processor, to cause the apparatus to carry out the interpolation of the new video frames computing a path graph from the image sequence, wherein the path graph represents minimized distances between consecutive video frames in the image sequence; and generating new video frames onto the path graph between the plurality of video frames of the image sequence.

15. The apparatus of claim 11, wherein the at least one memory and the computer program code are configured, with the at least one processor, to cause the apparatus to:

upon detecting in a first classification phase, as a result of said comparison, occurrence of a micro-expression on the face, output an indicator indicating the detection of the micro-expression; and as a result of the detection of the micro-expression, trigger a second phase comprising classifying a type of the micro-expression and outputting an indicator indicating the type of the micro-expression.

16. The apparatus of claim 11, wherein the at least one memory and the computer program code are configured, with the at least one processor, to cause the apparatus to:

store in the database reference facial feature parameters of a reference face;

normalize facial feature parameters of the face detected in the video frames to the reference facial feature parameters; and compute the spatio-temporal local texture descriptors from the video frames having the normalized facial feature parameters.

17. The apparatus of claim 11, wherein the apparatus is at least one of the following special-purpose apparatuses: a lie-detection apparatus, a security apparatus, and a business negotiation monitoring apparatus.

* * * * *